US008478436B2

(12) United States Patent
McAdoo et al.

(10) Patent No.: US 8,478,436 B2
(45) Date of Patent: Jul. 2, 2013

(54) APPARATUS, METHOD AND COMPUTER PROGRAM PRODUCT FOR PROVIDING AUTOMATED TRUSS ASSEMBLY

(75) Inventors: David L. McAdoo, Alvarado, TX (US); Timothy K. McAdoo, Grand Prairie, TX (US)

(73) Assignee: Illinois Tool Works Inc., Glenview, IL (US)

( * ) Notice: Subject to any disclaimer, the term of this patent is extended or adjusted under 35 U.S.C. 154(b) by 1371 days.

(21) Appl. No.: 12/183,611

(22) Filed: Jul. 31, 2008

(65) Prior Publication Data

US 2010/0024354 A1 Feb. 4, 2010

(51) Int. Cl.

| | |
|---|---|
| ***B21D 47/00*** | (2006.01) |
| ***B23Q 7/00*** | (2006.01) |
| ***B25B 1/00*** | (2006.01) |
| ***E04B 1/18*** | (2006.01) |
| ***E04C 3/02*** | (2006.01) |
| ***E04G 21/00*** | (2006.01) |
| ***G06F 19/00*** | (2011.01) |

(52) U.S. Cl.

USPC ............. 700/117; 700/97; 700/114; 700/167; 29/559; 29/897.31; 52/633; 52/745.19; 269/37; 269/910

(58) Field of Classification Search

USPC ................... 700/97, 112, 113, 114, 167, 213, 700/245; 29/897.31, 559, 783; 52/745.19, 52/633; 901/50; 269/37, 910

See application file for complete search history.

(56) References Cited

U.S. PATENT DOCUMENTS

| | | | | |
|---|---|---|---|---|
| 4,426,059 | A * | 1/1984 | Mort | 248/637 |
| RE31,807 | E * | 1/1985 | Knowles | 52/693 |
| 4,965,740 | A * | 10/1990 | Schofield et al. | 703/1 |
| 2005/0217185 | A1* | 10/2005 | Moulton et al. | 52/36.4 |
| 2008/0172983 | A1 | 7/2008 | Urmson | |
| 2010/0024345 | A1* | 2/2010 | McAdoo et al. | 52/690 |
| 2010/0030363 | A1* | 2/2010 | McAdoo et al. | 700/112 |
| 2010/0030369 | A1* | 2/2010 | McAdoo et al. | 700/213 |
| 2010/0154218 | A1 | 6/2010 | Turulin | |

FOREIGN PATENT DOCUMENTS

| | | | |
|---|---|---|---|
| CA | 2 469 249 | A1 | 9/2005 |
| CA | 2 612 620 | | 12/2006 |
| WO | WO 2006111606 | A1 * | 10/2006 |
| WO | WO 2006136653 | A1 * | 12/2006 |

OTHER PUBLICATIONS www.tctwebsaw.com/medialrobotomation.pdf, viewed Aug. 25, 2008, 2 page.

Canadian Office Action from Canadian Patent Application No. 2,665,315, dated Feb. 2, 2012.

* cited by examiner

*Primary Examiner* — Mohammad Ali
*Assistant Examiner* — Jennifer L Norton
(74) *Attorney, Agent, or Firm* — Alston & Bird LLP

(57) ABSTRACT

A truss assembly station may include a truss assembler. The truss assembler may be configured to enable assembly of a truss from truss members by providing an automatic sequential placement of the truss members based at least in part upon a planned location of pre-plated truss members within an assembled truss. The pre-plated truss members may be truss members including at least one connector plate installed thereon prior to placement at the truss assembly station.

8 Claims, 12 Drawing Sheets

APPARATUS, METHOD AND COMPUTER PROGRAM PRODUCT FOR PROVIDING AUTOMATED TRUSS ASSEMBLY

FIELD OF THE INVENTION

Embodiments of the present invention generally relate to truss fabrication and, more particularly, relate to a system and apparatus for providing automated truss assembly.

BACKGROUND OF THE INVENTION

Trusses are common components for many construction framing projects. However, despite the ubiquitous nature of trusses, it is relatively rare that any single truss design is replicated to a large extent. As such, many trusses are custom built for a particular construction project. Due to the highly customized residential and commercial construction markets, a strain is placed on truss manufacturers, which may be particularly acute in the area of set up. For that reason, much of the automation associated with truss fabrication has been focused on automating set up functions for cutting and assembly.

Currently, pieces of lumber are cut to the precise length and properly angled end, sorted and stacked after sawing, and transported to a staging area where truss assembly is performed. When the production schedule requires, the cut and sorted pieces may be moved to the assembly area along with needed connectors, which may include plates with teeth that imbed at least partially into wood members of the truss at their ends or along their length to hold the members together during the assembly process. The pieces may then be laid into an assembly jig, which provides a form or guide for member placement and truss assembly. The connectors may be placed on both top and bottom faces of the lumber at the joints between adjacent pieces.

Due to the custom nature of truss fabrication, it is often necessary to readjust the jig for each different truss. Accordingly, mechanisms have been developed to increase efficiencies related to setting up a jig. For example, jigging tables using lasers to outline jig or lumber patterns or having slidable guide members for more rapid adjustment of the jig have improved the ability of fabricators to customize jigs. However, the placement of lumber in the jig is typically done manually. The installation of connectors is also typically done by hand.

While the top face of the lumber is readily accessible, the bottom face is not since it is typically in contact with a jigging table or other substrate upon which the jig is provided. Accordingly, placement of a top plate, which is a connector engaging a top face of various members forming a joint in the truss, may not be difficult. In fact, various mechanisms including outlining a form of a plate on the various members have been developed to increase efficiency in placement of plates or connectors for the top faces of the lumber in the truss. However, it is typically necessary for the lumber pieces or members forming a particular joint to be simultaneously lifted so that the bottom plate can be slid underneath and properly located. Moreover, the location of the bottom plate is often determined by feel or merely from the positioning of edges that may be visible from above.

U.S. Pat. No. 5,440,977 to Poutanen describes one mechanism aimed at improving truss assembly by affixing connector or nail plates to some truss members prior to transporting the members to an assembly station. However, the assembly of truss members in Poutanen is manual. Although the prior plating of the connector plates may speed the truss assembly process, errors associated with manual handling and placement of truss members may still be introduced.

Given that truss manufacturing is likely to remain a highly customized process and also given that mechanisms for automating truss manufacturing may have the capability of providing time and cost savings that may present market advantages to those employing automation techniques, it may be desirable to introduce a system and/or various system components that may overcome at least some of the disadvantages described above, or further automate the truss assembly process.

BRIEF SUMMARY OF THE INVENTION

Accordingly, embodiments of the present invention may provide a truss assembly system and various components thereof. As such, exemplary embodiments may enable increased efficiency in truss assembly by automating several or even all portions of the truss assembly process. Moreover, a truss assembly system of an exemplary embodiment of the present invention may include modular elements that may be instantiated in a truss assembly process in any order and at time intervals that suit a truss manufacturer's budget or needs.

In an exemplary embodiment, a truss assembly station is provided. The truss assembly station may include a truss assembler. The truss assembler may be configured to enable assembly of a truss from truss members by providing an automatic sequential placement of the truss members based at least in part upon a planned location of pre-plated truss members within an assembled truss. The pre-plated truss members may be truss members including at least one connector plate installed thereon prior to placement at the truss assembly station.

In another exemplary embodiment, a method of assembling a truss is provided. The method may include utilizing a truss assembler for forming the truss by sequentially placing truss members to form truss joints between the truss members by placing a first truss member including a first connector plate previously installed at a portion of the first truss member that is adjacent to a surface on which the truss is assembled, and forming a joint between the first truss member and at least one other truss member such that a last truss member of the joint including a second connector plate previously installed at a portion of the last truss member that faces opposite to the surface on which the truss is assembled is placed in contact with the first truss member such that the first connector plate is in contact with the last truss member and the second connector plate is in contact with the first truss member.

In another exemplary embodiment, a computer program product for controlling automatic assembly of a truss is provided. The computer program product may include at least one computer-readable storage medium having computer-executable program code portions stored therein. The computer-executable program code portions may include multiple program code portions. A first program code portion may be for controlling a truss assembler forming the truss by sequentially placing truss members to form truss joints between the truss members by executing a second program code portion and a third program code portion. The second program code portion may be for placing a first truss member including a first connector plate installed at a portion of the first truss member that is adjacent to a surface on which the truss is assembled. The third program code portion may be for forming a joint between the first truss member and at least one other truss member such that a last truss member of the joint including a second connector plate installed at a portion of the last truss member that faces opposite to the surface on which the truss is assembled is placed in contact with the first truss member such that the first connector plate is in contact with the last truss member and the second connector plate is in contact with the first truss member.

Exemplary embodiments of the invention may enable increased automation of a truss assembly process. Exemplary embodiments may also enable truss manufacturers to employ embodiments of the present invention in total or in partial increments to suit their needs or desires. Accordingly, for example, both the efficiency and quality of truss manufacturing may be improved.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
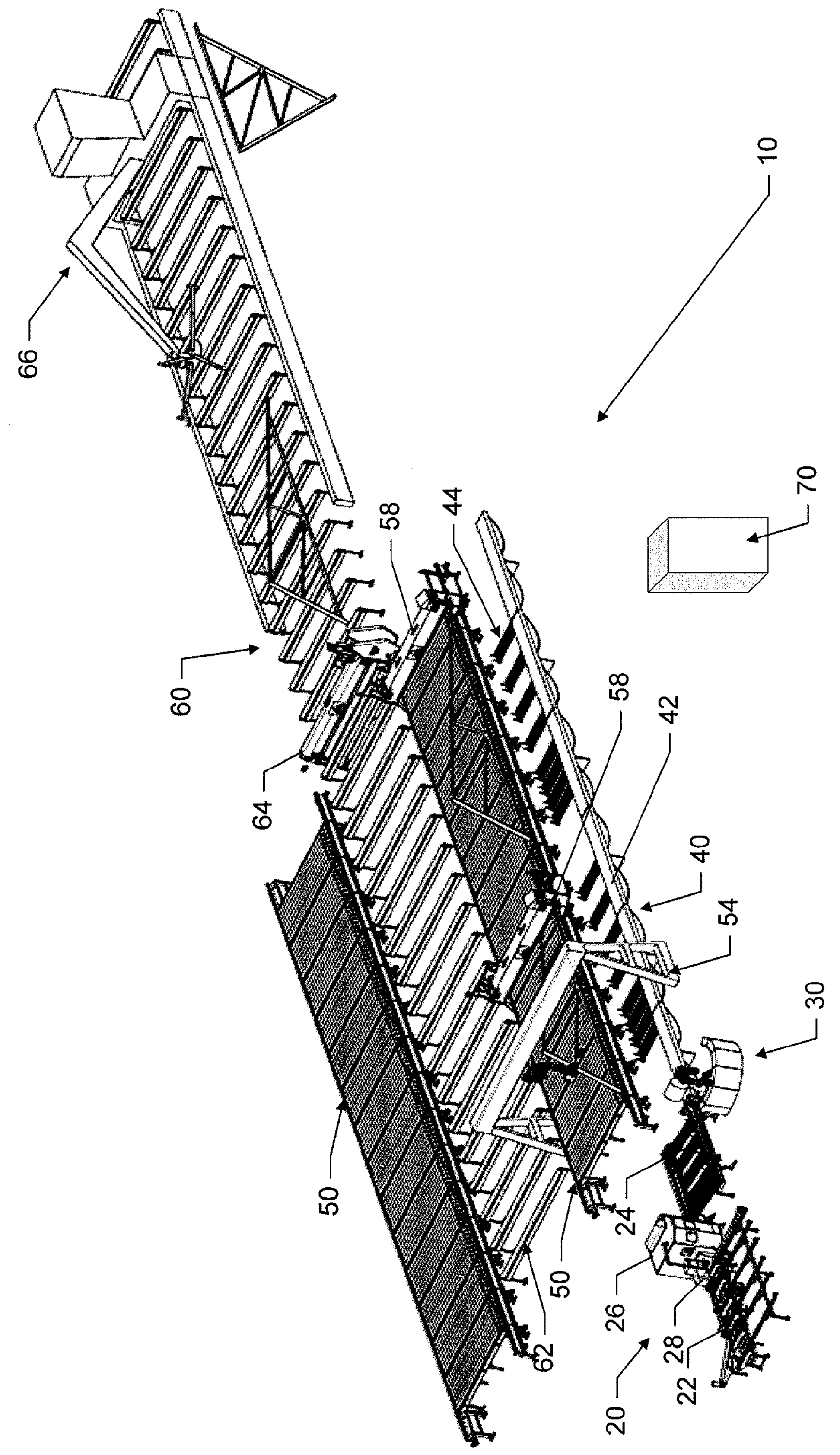
FIG. 1 is a perspective view illustrating a system that may benefit from exemplary embodiments of the present invention.

Embodiments of the present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like reference numerals refer to like elements throughout. Furthermore, as used herein "or" may be interpreted as a logical operator that results in true whenever one or more of its operands are true.

FIG. 1 is a basic block diagram illustrating a system 10 that may benefit from exemplary embodiments of the present invention. As shown and described herein, the system 10 could be employed in the context of a truss manufacturing process. The system 10 may include various stations in which each station performs a particular function with respect to the overall function of the system 10. In particular, each station may represent a functional module which can be implemented in accordance with embodiments of the present invention. As such, embodiments of the present invention need not include, and in many cases may not include, every station. Indeed, embodiments of the present invention may enable the utilization of one or more, or even all of the stations for improving corresponding aspects of a truss manufacturing process, while not necessarily requiring a full implementation of the system shown. Stations not implemented in any particular embodiment may be replaced with conventional mechanisms for performance of corresponding functions or, for example, corresponding functions may be manually accomplished.

As shown in FIG. 1, the system 10 may include a cutting station 20, a pre-plating station 30, a pre-plated member transport station 40, a truss assembly station 50 and a truss transport station 60. Each of the stations will be described below in relation to the functions performed at the corresponding stations and exemplary structures for performing each respective function according to an exemplary embodiment. However, in some instances specific structures alternative to those shown in the drawings and descriptions that follow may also be employed.

The cutting station 20 may include an infeed assembly 22 and an outfeed assembly 24, each of which may be operatively coupled with a cutting device such as a saw. In an exemplary embodiment, the saw may be, for example, a linear saw 26 such as the Alpine Linear Saw (ALS) produced by Alpine Engineered Products. Thus, the linear saw 26 may be configured to receive stock lumber such as a board or piece of lumber transported linearly to the linear saw 26 by the infeed assembly 22 and transported linearly away from the linear saw 26 by the outfeed assembly 24. After cutting by the linear saw 26, a work piece is transported away from the cutting station 20. The work pieces referred to herein may include exemplary truss members or truss components.

In an exemplary embodiment, the infeed assembly 22 may include a conveyor such as rollers, a conveyor belt or other form of conveyance for providing a distal end of an elongated work piece such as an end portion of a piece of lumber into the linear saw 26. Similarly, the outfeed assembly 24 may also include a conveyor such as rollers, a conveyor belt or other form of conveyance for receiving a distal end of the work piece such from the linear saw 26 to transport the work piece from the linear saw 26 in a linear fashion. The rollers may all be powered or non-powered rollers. Alternatively, only certain ones of the rollers may be powered. Furthermore, in some embodiments, the conveyor may include a combination of belts and rollers. According to an exemplary embodiment, the infeed assembly 22, the outfeed assembly 24 and the linear saw 26 may all operate on a single board in sequence to enable the board to pass through the cutting station 20 in a linear or inline fashion.

The linear saw 26 may include an intake motion controller and an outbound motion controller that may take control of a work piece provided from the infeed assembly 22 and provide control to the outfeed assembly 24, respectively, for a work piece cut in the linear saw 26. In this regard, one of the intake motion controller and the outbound motion controller may operate as a master at any given time while the other operates as a slave. Each of the inbound motion controller and/or the outbound motion controller may be equipped to engage and transport a work piece through the linear saw (e.g., via a belt or roller mechanism). In an exemplary embodiment, both inbound motion controller and the outbound motion controller may include a clamping top and bottom roller or belt assembly between which the workpiece is passed and driven through frictional engagement. Dependent upon the work piece being cut, or the stage of the cutting of the work piece, the intake motion controller and the outbound motion controller may alternate master/slave operations to ensure proper cutting of the work piece as the work piece is passed linearly though the linear saw 26. The conveyor of either or both of the infeed assembly 22 and the outfeed assembly 24 may be powered or may be fed manually until the intake motion controller receives an inbound work piece or until the outbound motion controller releases an outbound workpiece.

In an exemplary embodiment, the linear saw 26 may include, for example, prior to the intake motion controller, a marking device 28. The marking device 28 may be configured to print or otherwise place indicia on a work piece to identify the work piece and/or provide markings for use in pre-plating, ordering, or arranging the work piece at a later station. The cutting information is provided to the saw through a CAD-CAM communication of the truss design details to the saw computer. The indicia may be an ink, paint or other visible marking placed on the work piece. Alternatively, the indicia may be a barcode, a radio frequency identification (RFID) tag or other marking that may be read by a vision system or RFID tag reader or other means.

In an exemplary embodiment, the linear saw 26 may be operated by a machine controller (not shown) employing software or otherwise configured to enable pre-programming of cuts to be performed on a particular board. The indicia will typically be used to provide information to operations downstream from the saw. Thus, for example, the linear saw 26 may get all the information it needs to cut and mark truss pieces from the CAD-CAM communication described above. The machine controller may also be in communication with a master control station 70, which may communicate with one or more of the various stations of embodiments of the present invention. The control station 70 may include at least a processor, memory, and a user interface for enabling the user to interface with the control station 70 to direct operations or pre-program operations of one or more of the stations as described in greater detail below. As an alternative, rather than using a central control mechanism such as the control station 70, embodiments of the present invention may be operated by entering job related information into a central database or local database of a respective machine controller of a device of each of the various stations described herein. As such, at each respective machine controller, job related information may be accessed and the corresponding device may operate according to specifications provided in association with the selected job. Each job may correspond to truss design data defining, for example, the length and types of cuts to be applied to each truss member or work piece, the positions and orientations of the plates for each joint, ordering of the truss members for placement in a jig and positions of such members in the jig, etc.

In an exemplary embodiment, the control station 70 may store an application comprising computer readable program code portions (e.g., in the memory) for execution by the processor in which the execution of the application enables the provision of instructions to one or more respective stations for performance of a respective function as described in greater detail below. As such, the control station 70 may be in communication with one or more of the various stations (e.g., the cutting station 20, the pre-plating station 30, the pre-plated member transport station 40, the truss assembly station 50 and the truss transport station 60) or with certain components or devices of the respective stations as described in greater detail below. In connection with an exemplary embodiment, the control station 70 may be in communication with the linear saw 26 and/or the marking device 28 to provide information regarding how to cut and/or mark each work piece. In an exemplary embodiment, the control station 70 may further store (e.g., in the memory) engineering drawings that may describe, for example, specifications for truss assembly (e.g., truss design data). In some cases, various different truss designs may be stored in association with different jobs via a job identifier, or each different truss design may be associated with its own unique job or truss identifier. Thus, for example, the control station 70 may be configured to provide information regarding a particular job or job identifier to one or more stations and a particular device or component of a respective station to which information is provided (e.g., the cutting station 20, the pre-plating station 30, the pre-plated member transport station 40, the truss assembly station 50 and the truss transport station 60) may utilize information regarding the identified job or truss in order to adjust set up parameters, operating parameters or positioning criteria based on the information. Thus, a particular work piece may receive treatment at each station in accordance with a single overall plan, job description or engineering drawing to ensure appropriate operations including cutting, transport, pre-plating, placement, assembly, etc., are performed with respect to each different work piece that may ultimately be used as a truss member for assembly of a truss, or for an entire job or work order comprising multiple trusses.

In this regard, for example, after being cut by the linear saw 26, the work piece may be linearly extracted until the work piece is entirely out of the linear saw 26 and passed along to the outfeed assembly 24. In some instances, the outfeed assembly 24 may pass the work piece on to the pre-plating station 30 still in a linear fashion. As such, for example, the work piece may be extracted from the linear saw 26 and passed along to the pre-plating station 30 by the outfeed assembly 24 while remaining inline. However, in an alternative embodiment as shown in FIG. 1, the outfeed assembly 24 may include a translation mechanism for providing the work piece to the pre-plating station 30 by translating the work piece to a pre-plating intake subassembly 32 of the pre-plating station 30. The translation mechanism may include rollers, belts or other conveying mechanisms. However, in an exemplary embodiment, the translation mechanism may simply include a series of bars or skids extending substantially perpendicular to the elongated length of the work piece as the work piece extends out of the linear saw 26. In some embodiments, additional rollers or skids may extend between (and substantially perpendicular to) at least some adjacent ones of the bars or skids that extend from the outfeed assembly 24 to the pre-plating intake assembly 32.

Figure 2:
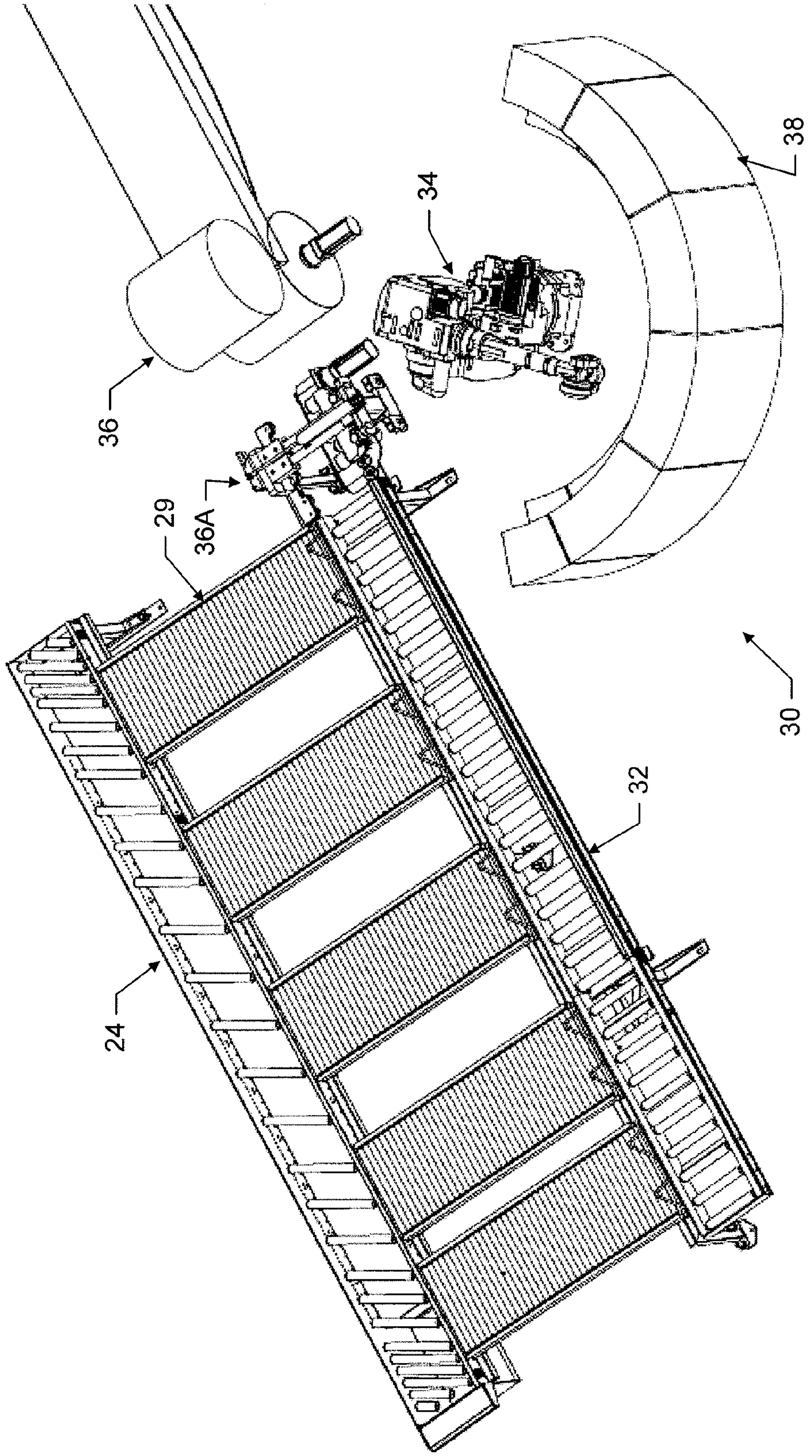
FIG. 2 illustrates an expanded view of a pre-plating station and outfeed assembly according to an exemplary embodiment of the present invention.

FIG. 2 illustrates an expanded view of the pre-plating station 30 and the outfeed assembly 24. In this regard, FIG. 2 shows the outfeed assembly 24 of the cutting station 20 being placed in operable communication with the pre-plating intake assembly 32 via a translation assembly 29 including the bars and skids described above. In an exemplary embodiment, the outfeed assembly 24 may be at a higher elevation than the pre-plating intake assembly 32 so that, in response to work piece being lifted out or pushed laterally with respect to the direction of exit from the linear saw 26, the work piece may slide by gravity to the pre-plating intake assembly 32 via the bars or skids of the translation assembly 29. In some exemplary embodiments, the translation assembly 29 may include retractable or removable gates that may stop work pieces from entering the pre-plating intake assembly 32 until such entry is desired. As such, the translation assembly 29 may be able to support a series of work pieces or a queue of lumber that is ordered for inclusion in the assembly of a truss.

In an exemplary embodiment, the pre-plating intake assembly 32 of the pre-plating station 30 may include a conveyor such as a roller, belt or other conveying device for linearly transporting the work piece into the pre-plating device 34, where the work piece may have a connector (e.g., a truss plate) installed by the pre-plating device 34. Connectors or plates as described herein typically have teeth or protrusions extending from one face. The teeth are typically seated within the material of the work piece to hold the plate in place with respect to the board or boards that are joined by the plate. By pre-plating a work piece, a plate is placed on the first piece to a joint at a position where a joint will be formed in order to enable formation of the joint by the addition of additional boards to the joint until the last board is added (having a plate that mirrors the plate on the first board of the joint). The plate on the first piece to the joint will be placed on the side of the piece that is facing down when placed in the assembly jig. The mirror plate on the last piece to the joint will be placed on the side that is facing up.

Figure 3:
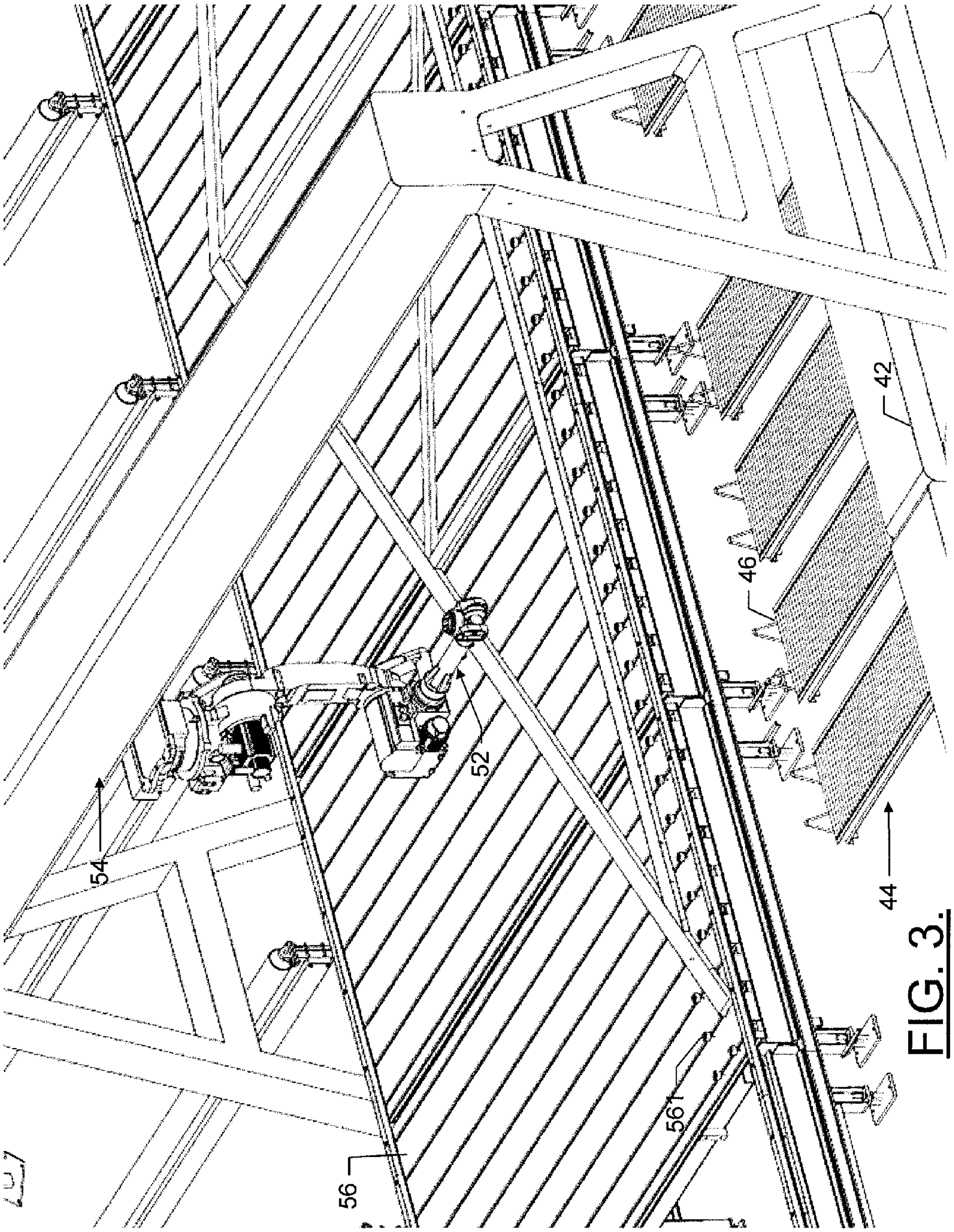
FIG. 3 illustrates an expanded view of portions of a pre-plated member transport station and truss assembly station according to an exemplary embodiment of the present invention.
Figure 4:
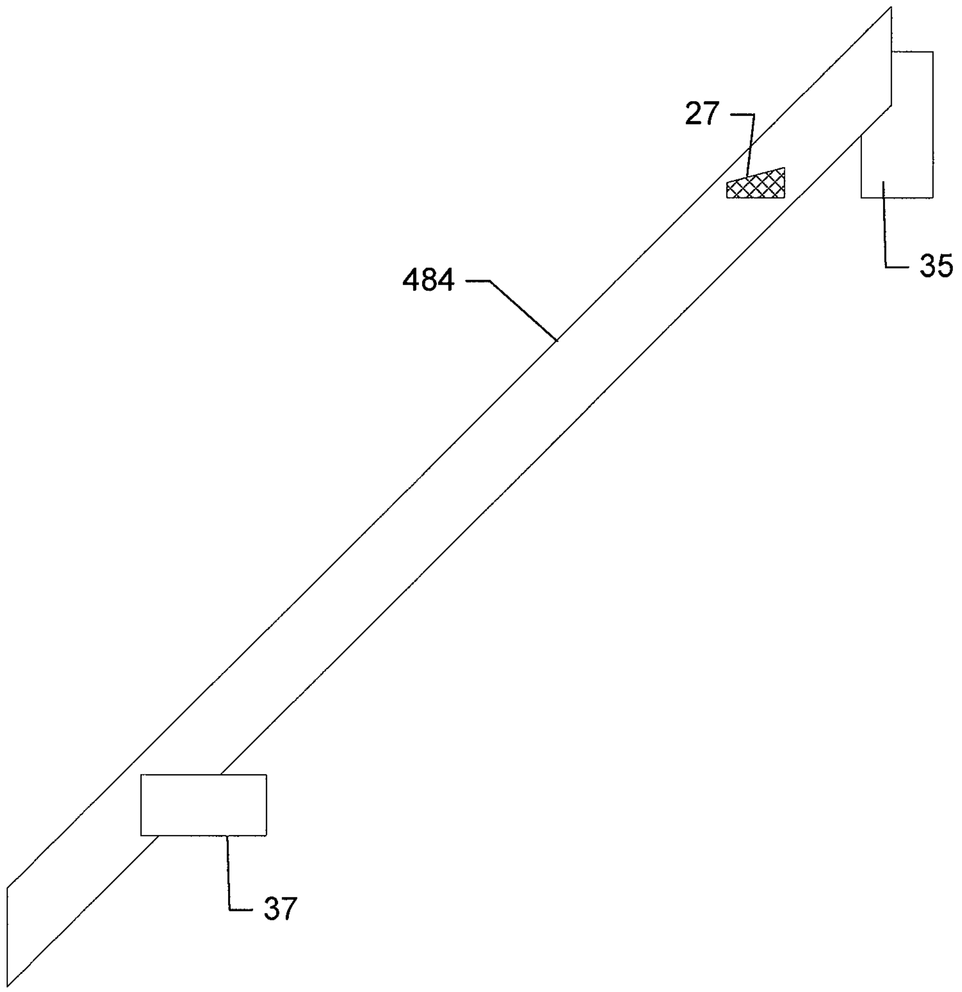
FIG. 4 illustrates a top view of a work piece or truss member having a bottom plate on a bottom face of a leading end of the work piece and a top plate on a top face of a middle portion of the work piece according to an exemplary embodiment of the present invention.

The pre-plating device 34 may, for example, include an intake motion controller 36A and an outbound motion controller (e.g., roller assembly 36) similar to those employed by the linear saw 26. In this regard, for example, the intake motion controller may include a top and bottom roller configured to engage the work piece and control movement of the work piece in a linear direction through the pre-plating device 34 until control of the movement is passed to the outbound motion controller. The outbound motion controller of an exemplary embodiment may include a roller assembly 36 including both a top roller and a bottom roller. The top roller may be configured to engage a top surface of the work piece while the work piece passes through the roller assembly 36 and the bottom roller may be configured to engage a bottom surface of the work piece as the work piece passes through the roller assembly 36. As such, the spacing between the rollers of the roller assembly 36 may be variable based on the thickness (or narrowest dimension) of the work piece. When spaced in this manner, the rollers may roll a connector plate into the work piece until the teeth of the connector plate are fully embedded and the tooth side surface of the connector plate is in contact with the lumber over the area of engagement. As can be seen in FIG. 4, all pre-plates have some area of engagement with the work piece. The area that does not engage the piece on which the pre-plate is placed will, in part or in whole, engage other work pieces when assembled into the truss as shown in FIG. 3.

According to an exemplary embodiment, the pre-plating device 34 may be a device such as, for example, a robot (e.g., a commercially available robot with a customized attachment for grabbing and seating plates), which is programmed or otherwise configured to pre-plate the cut work pieces provided from the cutting station 20 to the pre-plating station 30. In some instances, the pre-plating device 34 may include or be in communication with an indicia reader (e.g., either an RFID reader or a visual reading system), which may be configured to read the indicia provided by the marking device 28 to enable proper pre-plating of a corresponding work piece. In this regard, the pre-plating device 34 may be programmed or configured to obtain a plate from a plate storage facility 38. The plate storage facility 38 may be an array of plates of various different sizes, which may be accessible to the pre-plating device 34. As such, the pre-plating device 34 may access and/or extract a particular plate from the plate storage facility in order to enable the pre-plating device 34 to attach the particular plate to a work piece at a location and orientation which has been predetermined by an engineering program which designed the truss prior to the beginning of the truss fabrication process.

In an exemplary embodiment, the control station 70 may be in communication with the pre-plating device 34 to provide the pre-plating device 34 with instructions regarding plate selection and/or positioning. Alternatively, instructions regarding plate selection and/or positioning may be made locally at the pre-plating device 34 based on stored information (e.g., associated with a local machine controller of the pre-plating device 34) or based on the indicia. In this regard, in an exemplary embodiment, the indicia provided by the marking device 28 may include information indicating what size or type of plate to obtain from the plate storage facility 38 and may also indicate at what point or at what orientation to place the plate on the work piece. Thus, for example, based on a selected job identifier (e.g., from the control station 70 or the machine controller of the pre-plating device 34), the pre-plating device 34 may be configured to identify a particular work piece (e.g., based on the indicia read thereon) and, for the particular work piece and the selected job identifier, select a corresponding plate and place the selected plate at a position and in an orientation that is appropriate for the particular work piece. As another alternative, the job identifier itself may be indicated in the indicia so that the pre-plating device 34 (or the control station 70) may look up the job identifier associated with the work piece and, for example, information directing how the work piece is to be handled according to the corresponding job identified.

As an example, a piece of lumber may include indicia placed on the lumber by the marking device 28. The indicia may be read by the indicia reader of the pre-plating device 34. The pre-plating device 34 may extract plating instructions from the control station 70 or from a local database indicating, for the piece of lumber identified in relation to the corresponding job identifier (e.g., either pre-programmed or looked up based on the indicia), which plate should be selected. The pre-plating device 34 may then access the selected plate and, either based on the job identifier and the identified piece of lumber or based on information determinable from the indicia (e.g., decoded information or information looked up in a database), determine at what position or in what orientation to place the plate. While the lumber is controlled either by the intake motion controller for plating at or near a leading end of the piece of lumber, by the outbound motion controller for plating at or near a trailing end of the piece of lumber, or by whichever of the intake motion controller and the outbound motion controller is operating as the master motion controller for plating in a middle portion of the piece of lumber (e.g., where both the intake motion controller and the outbound motion controller may engage the piece of lumber during pre-plating) the pre-plating device 34 may affix the plate to the piece of lumber in a position and at an orientation that correlates to the position and orientation indicated in truss design data.

As an alternative, rather than receiving an identity of the work piece or decoding/looking up information indicating where to plate the work piece, the indicia itself may indicate where and/or how to pre-plate the work piece. In this regard, for example, one or both of the location and orientation of the indicia may determine at what position or in what orientation to place the plate. As such, the indicia may operate as an index mark. In an exemplary embodiment, the plate may be placed in a predefined relationship with respect to the index mark. Thus, for example, the index mark could indicate a mark or line with which an edge of the plate may be aligned. Alternatively, the index mark could be a predefined distance and/or orientation from the edge or another landmark position of the plate (e.g., center, corner, etc.). In some cases the index mark could provide indications regarding at what distance or in what orientation with respect to a landmark position of the plate, the plate should be placed.

In some embodiments the indicia may indicate on which side of the work piece the plate is to be attached. In this regard, the pre-plating device 34 may be enabled (e.g., by an articulated robot arm) to approach a work piece from either a top looking down or bottom looking up trajectory in order to plate either side of the work piece. Thus, for example, the pre-plating device 34 may be configured to apply a plate to either side of the work piece (e.g., either the top face or bottom face of a piece of lumber) while the work piece is passed through a gap between the intake motion controller and the outbound motion controller. Moreover, embodiments of the present invention may enable the pre-plating device 34 to apply a plate with respect to an index mark that is on the opposite side of the work piece than the side on which the plate is to be applied. In some instances, the pre-plating device 34 may place multiple plates on the same work piece, or no plates at all, dependent upon the position of the work piece in the truss to be assembled. If multiple plates are attached to the same work piece, the plates may even be applied such that at least one plate is affixed to an opposite side of the work piece with respect to a side on which at least one other plate is affixed. Thus, the pre-plating device 34 may, for example, place a plate (e.g., bottom plate 35) on a bottom face of a leading end of a piece of lumber and place a plate (e.g., top plate 37) on a top face of a trailing end or middle portion of the same piece of lumber (e.g., as shown for example in FIG. 4). FIG. 4 also shows, for exemplary purposes, an exemplary indicia 27 on the top face of the work piece. In yet another embodiment, the plate placement, order of attachment and side of attachment may all be independent of the indicia.

In some embodiments the work piece may be momentarily stopped for the application of the plate. However, in other embodiments, it may be desirable to actuate the pre-plating device 34 for plate application with timing and precision enabling pre-plating of a continuously moving work piece. Furthermore, although an exemplary embodiment is described herein in which the work piece (e.g., a piece of lumber having two opposing wider faces that are oriented up and down, respectively) is transported such that the top and bottom faces are the wider faces of the work piece, it may also be possible to practice embodiments of the present invention by transporting the work piece through the pre-plating device 34 on its side. In other words, the work piece may be tilted at any angle up to a ninety degree angle as it passes through the pre-plating device 34. Moreover, each work piece could be tilted to place an appropriate side (e.g., a side intended to receive a plate) toward the pre-plating device 34 to reduce the need for the pre-plating device 34 to approach the work piece at multiple different trajectories.

In an exemplary embodiment, the pre-plating device 34 may seat the plate into the work piece at least partially, while the roller assembly 36 may fully seat the plate. In this regard, for example, the pre-plating device 34 may utilize an electric, pneumatic, hydraulic or other suitably powered compression mechanism for partially seating the plate prior to passage of the plate through the roller assembly 36. Other alternatives than compression mechanisms are also possible. For example, plates may be fastened into position with a staple or nails that are automatically applied by the pre-plating device 34 while the pre-plating device 34 holds the plate in the proper position. After passing through the roller assembly 36, the pre-plated work piece may be provided to the pre-plated member transport station 40.

The pre-plated member transport station 40 may receive a work piece from the roller assembly 36 of the pre-plating station 30 for transport to the truss assembly station 50. In an exemplary embodiment, as shown in FIG. 1, the pre-plated member transport station 40 may include a pre-plated member transporter 42 and a pre-plated member queue 44. FIG. 3 illustrates an expanded view of portions of the pre-plated member transport station 40 and the truss assembly station 50.

Notably, the pre-plated member transport station 40 and other devices referred to hereinafter that include the term "pre-plated" in their names do not necessarily only operate on pre-plated work pieces. To the contrary, as indicated above, since the pre-plating device 34 only plates those work pieces that are to be pre-plated in accordance with the job being performed (e.g., truss design data), some work pieces may pass through the system 10 without being pre-plated. As such, in more general terms, a member may merely be considered a work piece that has passed through the pre-plating device 34 or, more specifically, through the pre-plating station 30 since in some embodiments work pieces that are not to be pre-plated may bypass the pre-plating device 34. Meanwhile, a device having the term "pre-plated" in its name may therefore merely be indicative of the fact that the device can handle members that are pre-plated or members that are not pre-plated.

The pre-plated member transporter 42 may be embodied as a conveying mechanism configured to transport work pieces (e.g., lumber) in a linear fashion (e.g., with an end of one work piece following an end of a preceding work piece such that, while being transported, adjacent work pieces are inline or lie more or less in the same line with each other). As such, the pre-plated member transporter may include a conveyor of any suitable type such as, for example, a conveyor belt or a series or rollers. In some embodiments, since the work pieces transported by the pre-plated member transporter 42 may include plates that are partially seated attached thereto, it may be beneficial to use a conveyor belt or at least closely spaced rollers for the conveying mechanism in order to reduce the likelihood of a plate being caught in the conveying mechanism which might either remove the plate or jam the conveying mechanism.

The pre-plated member transporter 42 may be configured to transport a work piece to a position proximate to the pre-plated member queue 44 in an inline fashion. When the work piece arrives at the pre-plated member queue 44, the work piece may be placed in one of a plurality of queues 46. Each of the queues 46 may be an assembly such as a bed or table apparatus (or a collection of beds or table apparatuses) configured to hold work pieces prior to transportation of such work pieces to the truss assembly station 50. In some embodiments, the queues 46 may be sloped downward from the elevation of the pre-plated member transporter 42 so that when a particular work piece is pushed off of the pre-plated member transporter 42, the particular work piece may fall toward a gate at an end of the queue 46 that is farthest from the pre-plated member transporter 42. If more than one work piece is placed in the queue 46, the work pieces may lie in the queue in the order in which the work pieces were pushed off the pre-plated member transporter 42.

In an exemplary embodiment, the pre-plated member transport station 40 may further include one or more queue loaders. The queue loaders may be disposed proximate to the pre-plated member transporter 42 in order to push work pieces into the pre-plated member queue 44. In some cases, one queue loader may be disposed at a portion of the pre-plated member transporter 42 that is adjacent to each respective queue 46. As such, each queue loader may load a respective queue 46 with work pieces. In an exemplary embodiment, the queue loaders may be in communication with the control station 70 such that the control station 70 may provide ordering information defining an order for work pieces to be placed in each queue 46. In some embodiments, each queue 46 may store work pieces of a particular size or position in a particular truss. Depending upon the size or length of the work pieces, in some situations multiple queues 46 may be used to support a single work piece. Thus, in some embodiments, a single queue of work pieces may include work pieces extending over multiple queues 46. Alternatively, each queue 46 may store work pieces in an order corresponding to the order in which the work pieces are to be placed in a jig or assembled. As yet another alternative, each queue 46 may store work pieces associated with a separate truss. As such, although the queues 46 may be used to provide work pieces in a particular order associated with truss assembly, no ordering need necessarily be employed. From the pre-plated member queue 44, the work piece may be transported to the truss assembly station 50.

The truss assembly station 50 may include a truss assembler 52 (e.g., a truss assembly robot) that may be suspended from a mobile gantry 54 over a jigging table 56. The jigging table 56 may be a substantially flat surface upon which truss assembly may be performed. Thus, the jigging table 56 may be of a size large enough to accommodate trusses of sizes contemplated for assembly. In some embodiments, the jigging table 56 may typically be extended longer in a first direction to support the widest dimension of an assembled truss and shorter in a second direction that is substantially perpendicular to the first direction in order to support the height of the assembled truss. However, in alternative embodiments, the jigging table 56 may be further extended in the first direction in order to enable multiple trusses to be simultaneously assembled on a single jigging table 56.

In an exemplary embodiment, the jigging table 56 may also support a single roller gantry 58 that may be configured to ride over substantially the entire length of the jigging table 56. In this regard, for example, the single roller gantry 58 may be suspended over the jigging table 56 at a height above the table that corresponds substantially to the width of the work pieces used for truss assembly. Thus, when the single roller gantry 58 rolls over the jigging table 56, plates may be partially seated for joints between various assembled work pieces or members. In this regard, each such joint may include at least two members having a plate already fastened in those respective members (e.g., a bottom plate in the first member placed and a top plate seated in the last member placed. However, any additional members other than the first and last members for any particular joint may not have the plate fastened or seated within them until the single roller gantry 58 presses the plate therein. Likewise, the top plate will not have been seated in the first member and the bottom plate will not have been seated in the last member until the single roller gantry 58 presses the plate therein to partially seat the plate. The single roller gantry 58 may be housed in a suspension carriage that may ride, for example, on tracks that extend along an outer perimeter of the jigging table 56 along the first direction. Thus, one single roller gantry 58 may service a plurality of truss assembly stations on a single jigging table 56.

Likewise, the mobile gantry 54 may ride over tracks that include one track that extends along the outer perimeter of the jigging table 56 in the first direction on a side of the jigging table 56 that is opposite of the pre-plated member transporter 42 and another track that extends along the pre-plated member transporter 42 in the first direction on a side of the pre-plated member transporter 42 that is opposite of the jigging table 56. As such, the mobile gantry 54 may extend over both the jigging table 56 and the pre-plated member transporter 42 to enable the truss assembler 52 to service multiple truss assemblies at the truss assembly station 50 on a single jigging table.

In another exemplary embodiment, lumber may be placed on the jigging table at a portion of the jigging table not associated with a particular jig. The location of this jigging table portion could be parallel with the long dimension of the truss and within the longitudinal limits of the truss but no part of it may overlap the truss. For example: the pre-plating station could be in the space between the rail on the edges of the table and the bottom chord of the truss. When this is done, the pre-plates can be partially seated at the same time as the plates in the truss joints. Plates may be manually placed on the lumber based on the indicia on the lumber. The single roller gantry 58 may then be operated to at least partially seat the plates in the lumber to thereby pre-plate the lumber. The pre-plated lumber may then be placed in a jig (e.g., automatically by the truss assembler 52 or manually) to assemble a truss.

The truss assembler 52, which according to an exemplary embodiment, may include a robot suspended from the mobile gantry 54, may be configured to select and grab a particular work piece in order to transport the work piece from the pre-plated member queue 44 to the jigging table 56. The truss assembler 52 may then be configured to place the selected work piece (which may or may not be pre-plated) onto the jigging table 56 in a correct position based on an engineering plan (e.g., a truss design or job). In an exemplary embodiment, the truss assembler 52 may be in communication with the control station 70 to receive information about the engineering plan such as a job identifier or truss design data. However, as an alternative, the job identifier or truss design data may be locally entered into and/or accessed at the truss assembler 52 (e.g., via a machine controller of the robot). The truss assembler 52 may then assemble a truss based on the truss design data using work pieces in the pre-plated member queue 44.

In an exemplary embodiment, the truss assembler 52 may take work pieces from the pre-plated member queue 44 in the order in which the work pieces are provided in the pre-plated member queue 44 and apply the work pieces in their respective positions on the jigging table 56 according to truss design data. In such an embodiment, it may be assumed that the work pieces were cut and pre-plated (or passed through the pre-plating station 30) in an order that enabled the queue loader to push work pieces off the pre-plated member transporter 42 into the pre-plated member queue 44 in the general sequence or order in which the work pieces are to be assembled according to the truss design data provided either locally at various stations or via the control station 70.

In an alternative embodiment, the truss assembler 52 may further include or be in communication with a reader (e.g., a vision system or RFID reader) such that the truss assembler 52 may read (or interrogate) each work piece in the pre-plated member queue 44 in order to find and select the next piece in sequence to be placed on the jigging table 56. If needed, the truss assembler 52 may be configured to search multiple queues 46 for the next piece. As yet another alternative, if the reader includes a vision system, the truss assembler 52 may be configured to determine characteristics of a particular work piece based on a visual inspection of the work piece (e.g., for characteristics such as length, shape, plate position, or the like). In this regard, for example, the reader of the truss assembler 52 may scan one or more work pieces in the pre-plated member queue 44 to classify or otherwise identify characteristics of the work pieces for determining how each work piece correlates to the truss design data.

Regardless of how the next piece to be added to the jigging table 56 is determined, once the next piece is found, the next piece may be selected (e.g., via an articulated robot hand or other selection member) by the truss assembler 52 and transported using a combination of motions of the mobile gantry 54 along its track, the truss assembler 52 along the suspended rail of the mobile gantry 54, and multiple degrees of freedom of the truss assembler 52 to the jigging table 56. The truss assembler 52 may then orient the selected work piece in accordance with the truss design data to place the work piece in the jig at the correct location.

Because at least some of the work pieces may be pre-plated, the order in which the work pieces are placed on the jigging table 56 may be important. Notably, although the order in which the work pieces are placed on the jigging table 56 is important for truss assembly, this does not necessarily mean that only one order is acceptable. To the contrary, numerous different orderings may be suitable for some truss designs. However, in each case, the ordering of work piece placement with respect to the placement of pre-plated members for any joint may be provided to ensure that the first board in any joint includes the bottom plate and the last board in the joint includes the top plate. For example, for any particular joint within a truss, a work piece corresponding to the first piece that will form the joint may include the bottom plate and a work piece corresponding to the last piece that will form the joint may include the top plate. Accordingly, since the first piece for any joint includes the bottom plate, other pieces meeting the first piece at the joint may be placed in their respective positions relative to the first piece without complication. Then, when the last piece is placed relative to the other pieces, the joint may be complete with the addition of the top plate along with the last piece.

FIG. 5 illustrates an example of a sequence of truss assembly according to an exemplary embodiment of the present invention. The sequence of operations of FIG. 5 should be understood to be exemplary of an automatic truss assembly sequence performed, for example, by the truss assembler 52 possibly under control from software run by the control station 70. In this regard, for example, FIG. 5A shows a first truss member 500 with a first bottom plate 502 disposed at one end of the first truss member 500, a second bottom plate 504 positioned near, but not at, the opposite end of the first truss member 500, and a third bottom plate 506 positioned at a portion of the first truss member 500 that is between the first bottom plate 502 and the second bottom plate 504. Each of the bottom plates (502, 504 and 506) may have been fastened prior to the first truss member 500 arriving at the assembly station.

Figure 5A:
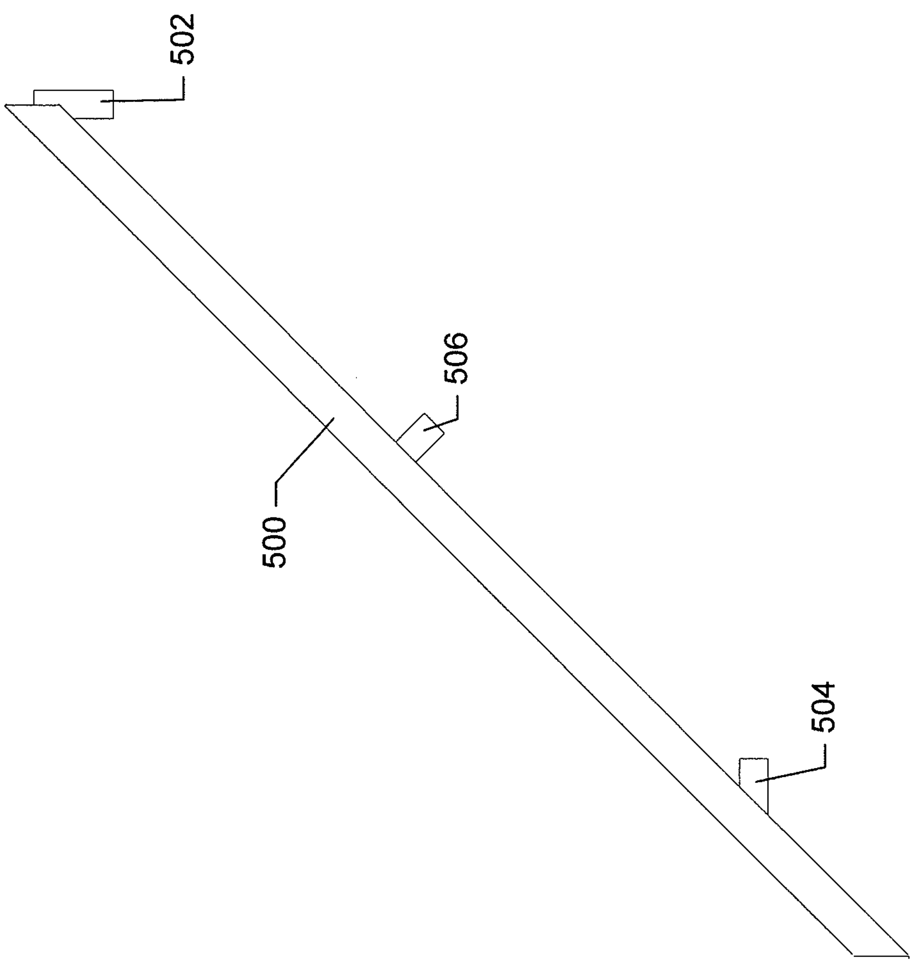
FIG. 5 illustrates an example of a sequence of truss assembly according to an exemplary embodiment of the present invention.
Figure 5B:
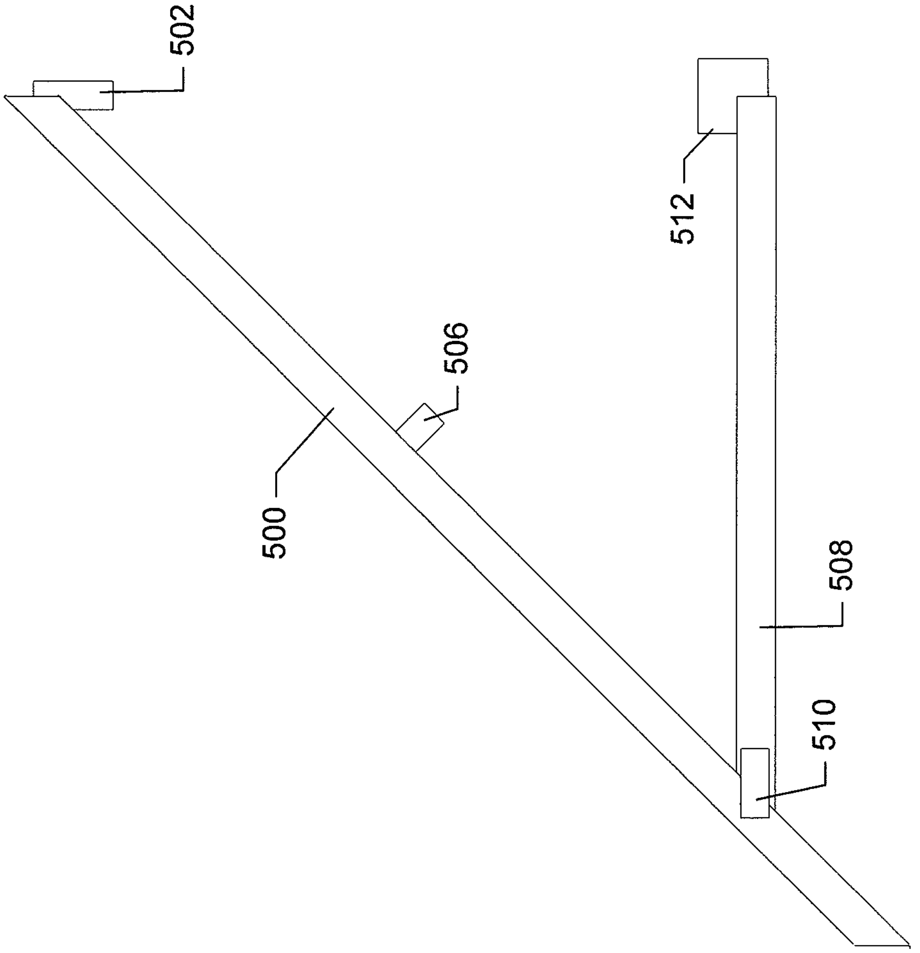

As shown in FIG. 5B, a second truss member 508 may be included in the truss by forming a joint with the first truss member 500. In this example, the second truss member 508 may be placed (e.g., based on truss design data) in contact with the first truss member 500 by placing the second truss member 508 in contact with the second bottom plate 504 at an orientation determined based on the truss design data, markings on one of the truss members, or jig arrangement. As can be seen from FIG. 5B, the second truss member 508 is the last truss member for the joint being formed, so the second truss member 508 may also include a first top plate 510 that may mirror the second bottom plate 504 with respect to orientation and position. The second truss member 508 may also include a fourth bottom plate 512 positioned at an end of the second truss member 508 that is opposite of the end on which the first top plate 510 is positioned. Both the first top plate 510 and the fourth bottom plate may have been fastened within the second truss member 508 prior to arriving at the assembly station.

Figure 5C:
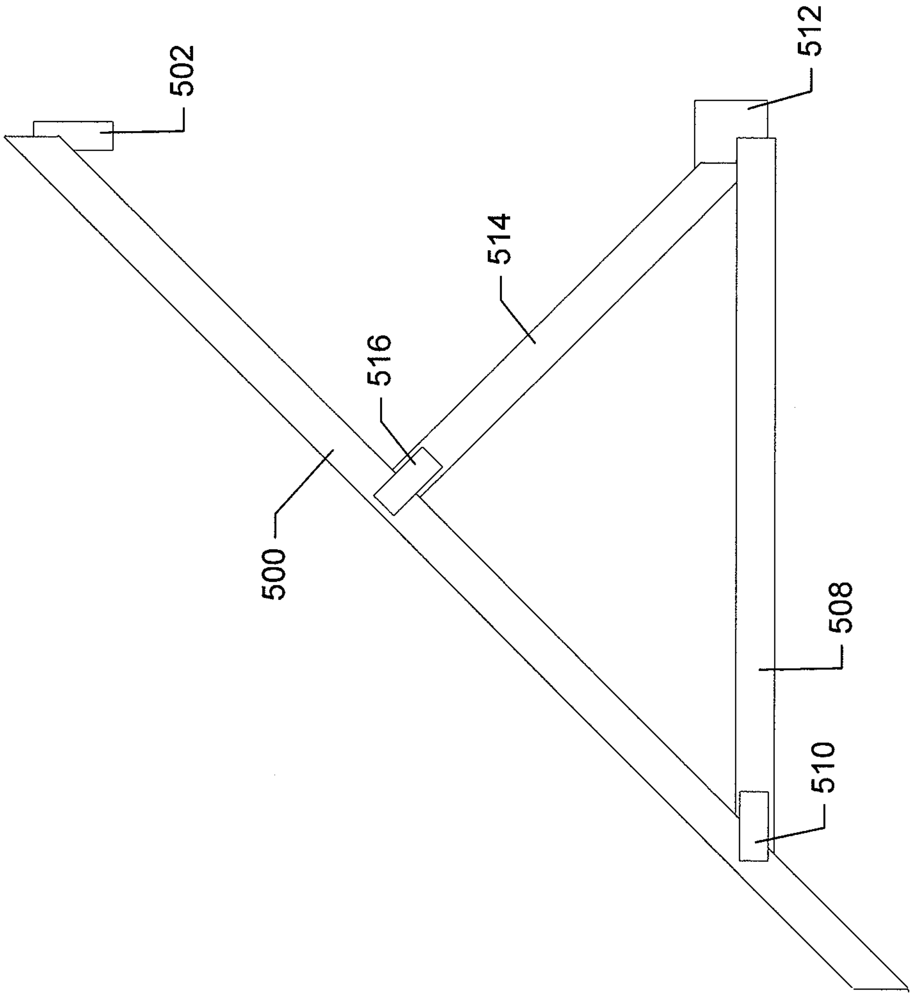

As shown in FIG. 5C, a third truss member 514 may be positioned within the truss to extend from the third bottom plate 506 to the fourth bottom plate 512. The third truss member 514 may include a second top plate 516 positioned to engage the first truss member 500 and mirror the third bottom plate 506 to complete a joint between the third truss member 514 and the first truss member 500. The fourth bottom plate 512 may engage an end portion of the third truss member 514. The second top plate 516 may have been fastened within the second truss member 508 prior to arriving at the assembly station.

Figure 5D:
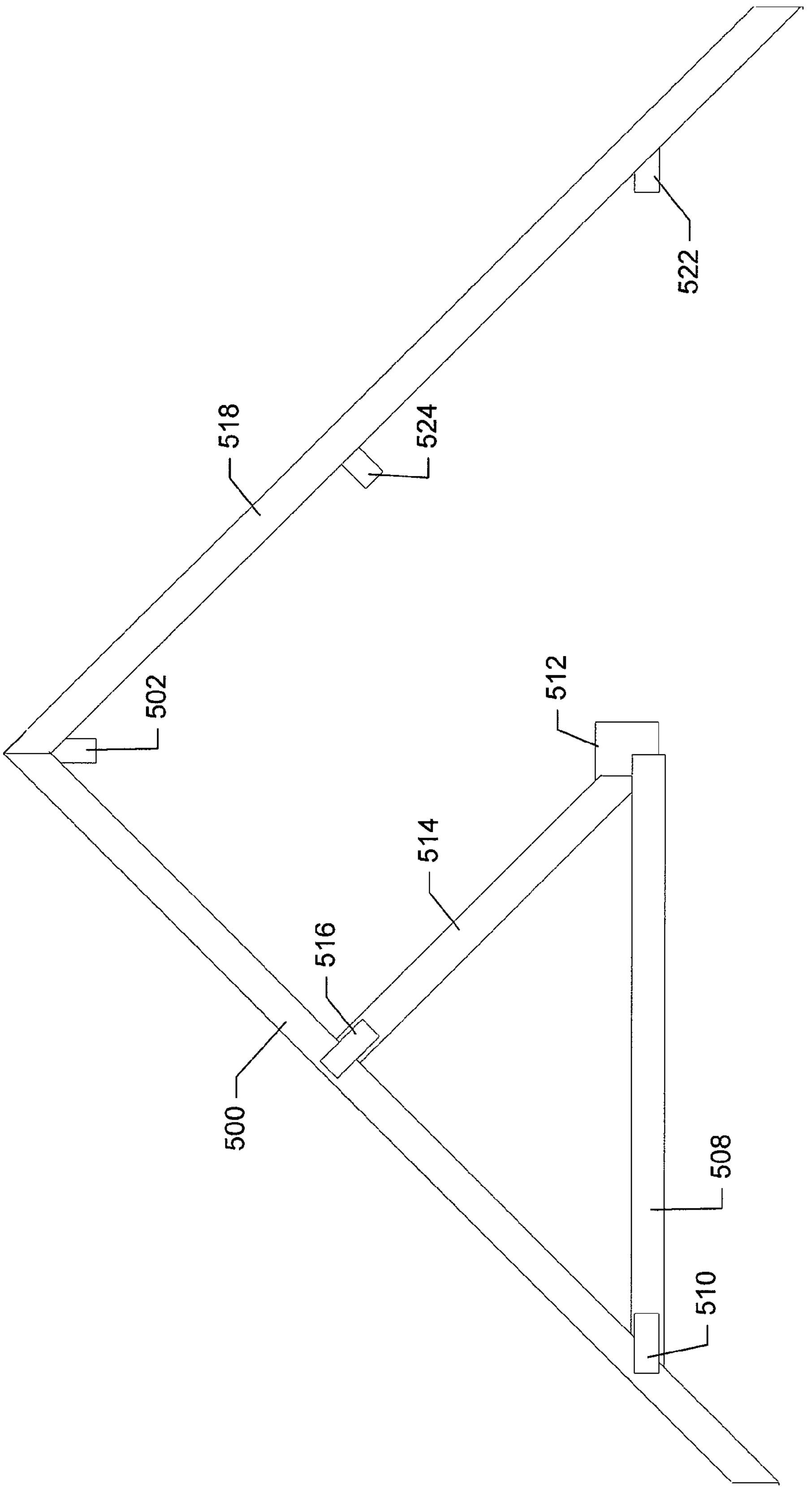

As shown in FIG. 5D, a fourth truss member 518 may then be positioned within the truss to extend from the first bottom plate 502 in substantially symmetrical fashion with respect to the first truss member 500. The fourth truss member 518 may include a fifth bottom plate 522 positioned near, but not at, the opposite end of the fourth truss member 518, and a sixth bottom plate 524 positioned at a portion of the fourth truss member 518 that is between the first top plate 502 and the fifth bottom plate 522. Each of the plates (522 and 524) may have been fastened prior to the fourth truss member 518 arriving at the assembly station.

Figure 5E:
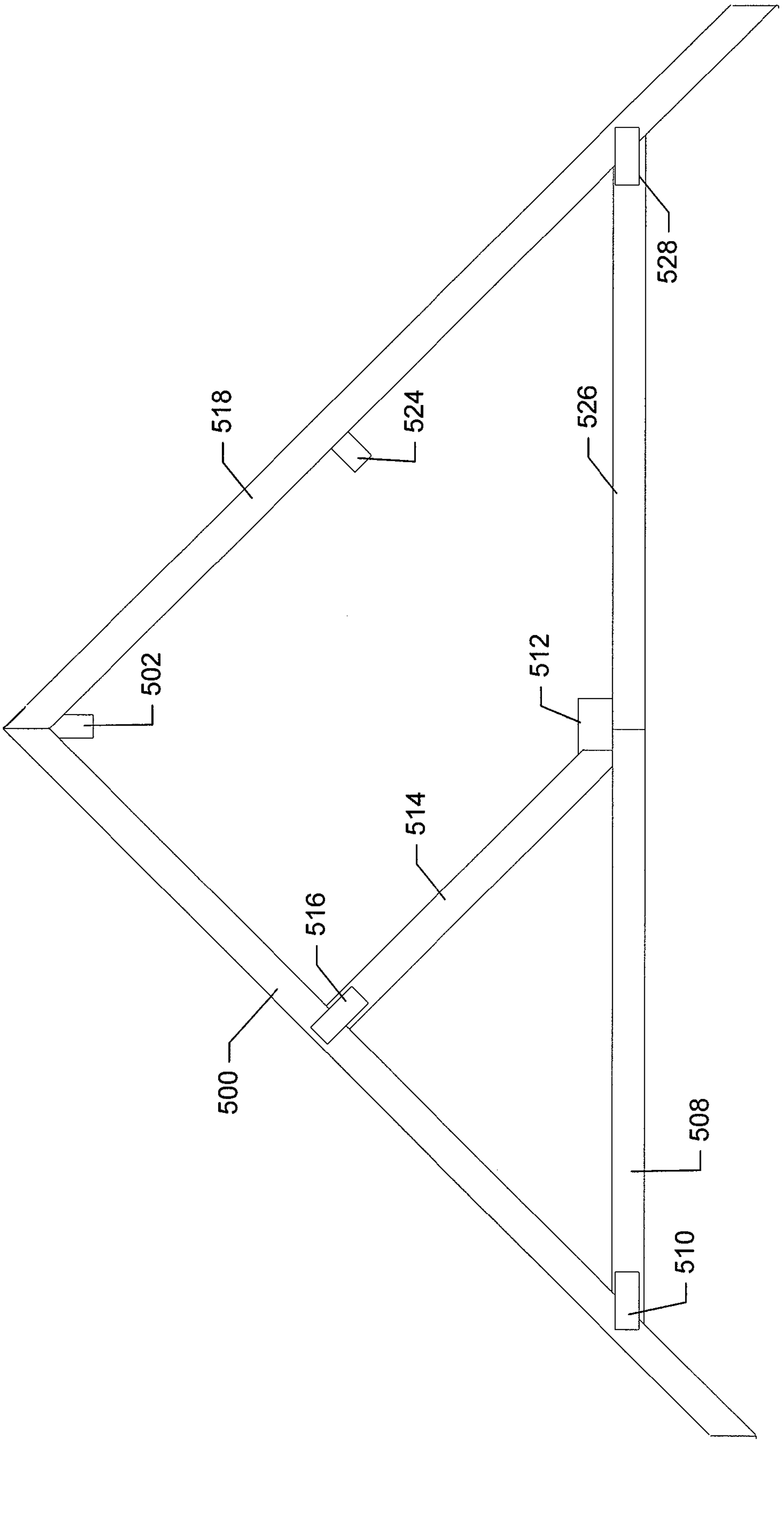

As shown in FIG. 5E, a fifth truss member 526 may be positioned within the truss to extend from the fourth bottom plate 512 to the fifth bottom plate 522. The fifth truss member 526 may engage the second truss member 508 via the fourth bottom plate 512. The fifth truss member 526 may include a fourth top plate 528 positioned to engage the fourth truss member 518 and mirror the fifth bottom plate 522. The fourth top plate 528 may have been fastened within the fifth truss member 526 prior to arriving at the assembly station.

Figure 5F:
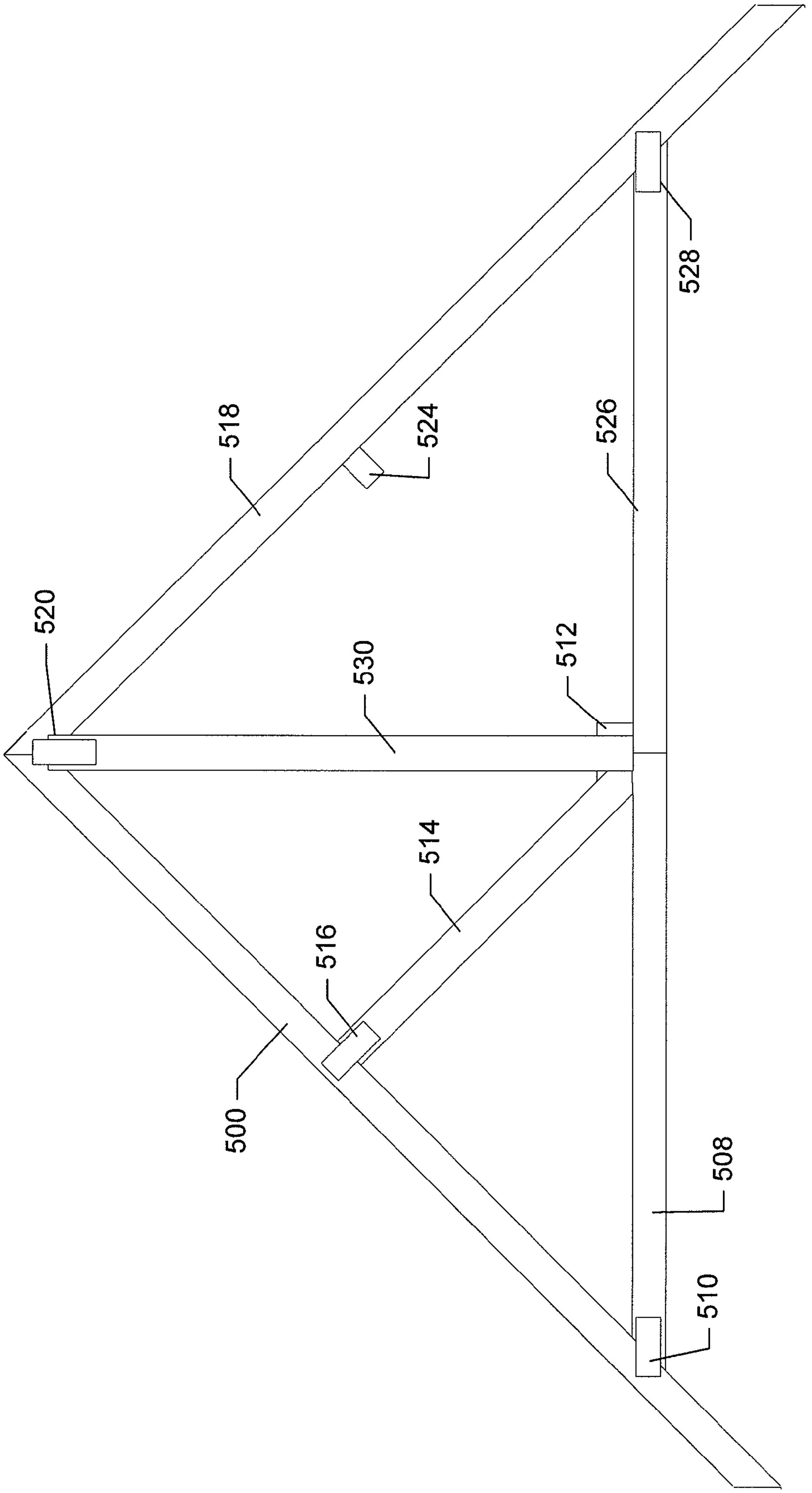

As shown in FIG. 5F, a sixth truss member 530 may be positioned within the truss to extend from the first bottom plate 502 to the fourth bottom plate 512. The sixth truss member 530 may include a third top plate 520 positioned to mirror the first bottom plate 502 and complete the joints between the sixth truss member 530 and the first truss member 500 and the fourth truss member 518. The third top plate 520 may have been fastened within the sixth truss member 530 prior to arriving at the assembly station.

Figure 5G:
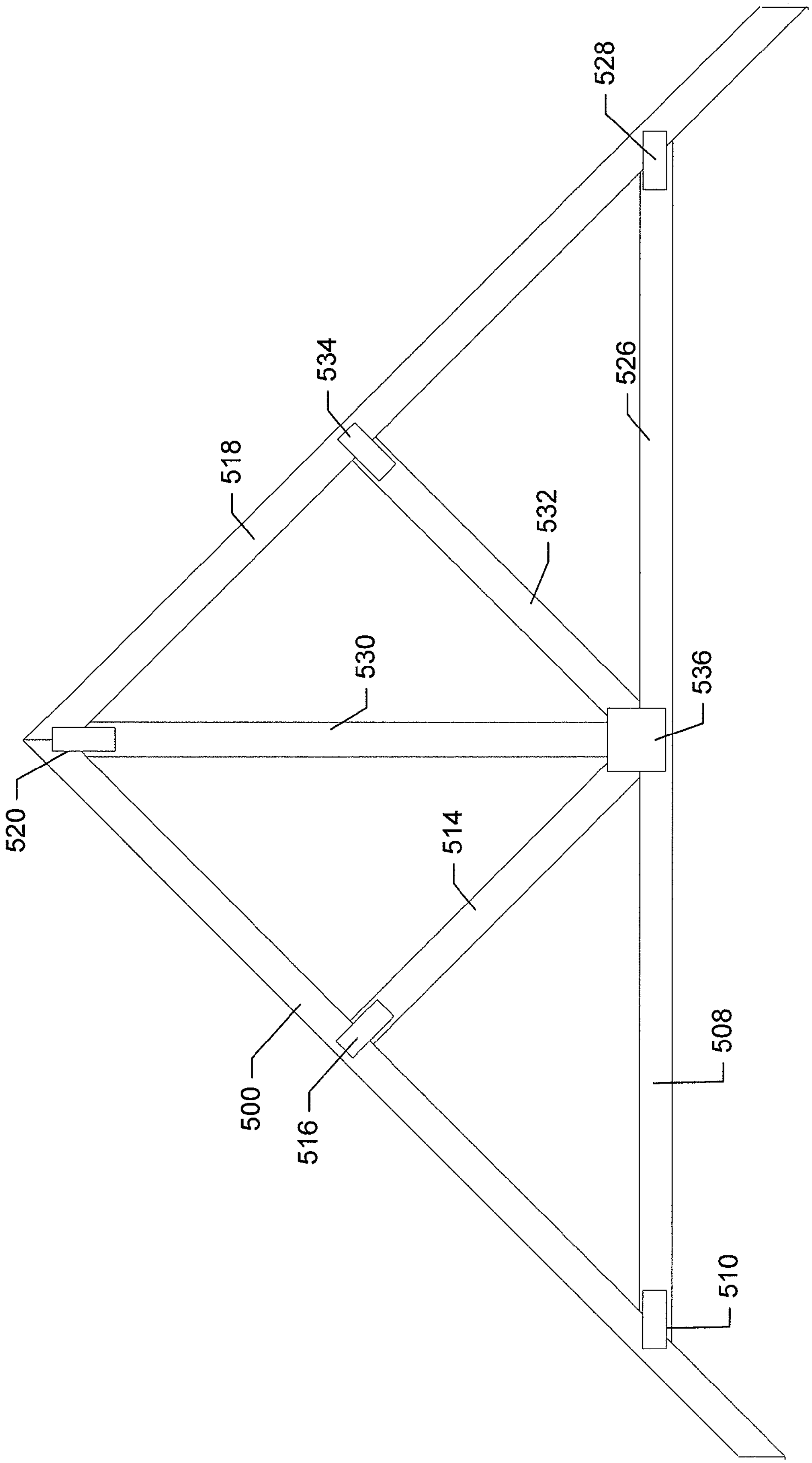

As shown in FIG. 5G, a seventh truss member 532 may be positioned within the truss to extend from the sixth bottom plate 524 to the fourth bottom plate 512. The seventh truss member 532 may include a fifth top plate 534 positioned to engage the fourth truss member 518 and mirror the sixth bottom plate 524 to complete a joint between the fourth truss member 518 and the seventh truss member 532. The seventh truss member 530 may also include a sixth top plate 536 positioned to engage the sixth truss member 530, the second truss member 508, the third truss member 514 and the fifth truss member 526. The sixth top plate 536 may also mirror the fourth bottom plate 512 and complete the last joint of the truss. The fifth top plate 534 and the sixth top plate 536 may have been fastened within the seventh truss member 532 prior to arriving at the assembly station.

Thus, the embodiment of FIG. 5 illustrates an example in which the truss assembler 52 may assemble a truss by placing truss members into place to form joints in which for each joint, the first member has a bottom plate pre-plated and the last member of the joint has a top plate pre-plated.

The jigging table 56 (shown in greater detail in FIG. 3) may include mobile jig stops 561 that may be configured to be movable to a desirable location along the jigging table 56 to form a jig. As such, in an exemplary embodiment, the jigging table 56 may be comprised of a plurality of spaced apart flat slats that extend in the second direction parallel to each other to span the width of the jigging table 56. The mobile jig stops 561 may be configured to ride in spaces or slots defined between the flat slats to a desired position. In an exemplary embodiment, the jigging table 56 may include a jig stop placement assembly including a plurality of drive motors configured to move the mobile jig stops 561 to a desired location on the jigging table 56. In an exemplary embodiment, the mobile jig stops 561 may be moved automatically to form a jig based on truss design data that may correspond to a particular job or job identifier that may be entered locally or received from the control station 70. The mobile jig stops 561 positioned to form the jig may assist the truss assembler 52 by holding placed pieces relatively steady while each new piece is added to form the truss. The mobile jig stops 561 may also assist the truss assembler 52 by providing position information or landmarks for the truss assembler 52 to use in positioning work pieces in their respective proper locations.

Once a complete truss is assembled, the single roller gantry 58 may be passed over the jigging table 56 to press the assembled truss and partially seat the portion of the plates at each joint which are separate from the pre-plated portions. In an exemplary embodiment, the single roller gantry 58 may make a continuous pass over the length of the jigging table 56 to press multiple assembled trusses. However, in an alternative embodiment, as shown in FIG. 1, multiple single rollers may be provided for use with each area in which a truss may be assembled on the jigging table 56.

In an exemplary embodiment, after an assembled truss has been pressed by the single roller gantry 58, the assembled truss may be passed to the truss transport station 60. In some embodiments, the jigging table 56 may include slots in a direction perpendicular to the long dimension of the jigging table 56 through which one or more vertical liftouts may be extended to lift at least one side of lightweight bars that may extend between the vertical liftouts. The lightweight bars may form a liftout assembly that may initially be positioned at a portion of the jigging table 56 such that the liftout assembly is between the jigging table and the assembled truss when the liftouts extend. Thus, the liftouts may be extendible to lift one side of the liftout assembly higher than the opposite side. Accordingly, sufficient slope may be provided to the liftout assembly to slide the assembled truss off of the liftout assembly and onto the truss transport station 60. The liftouts may be pneumatically, hydraulically, or electrically operated to lift a side of the liftout assembly that is proximate to the pre-plated member transporter 42 and opposite of the truss transport station 60.

As shown in FIG. 1, the truss transport station 60 may serve two separate truss assembly stations (each of which may include a respective cutting station, pre-plating station, and pre-plated member transport station). The truss transport station 60 may include a roller assembly 62, a double roller final press 64 and a knuckleboom truss stacker 66. The roller assembly 62 may include powered and/or non powered rollers provided in an array to form a conveyance mechanism for transporting an assembled truss through the final roller press 64 and on to the knuckleboom truss stacker 66 for stacking and/or shipment. The knuckleboom truss stacker 66 may include an arm configured to enable grasping, lifting, translating and stacking of assembled trusses. As shown in FIG. 1, prior to reaching the knuckleboom truss stacker 66, the assembled truss may be finally pressed to ensure full seating of the plates of each joint of the truss by the double roller final press 64. The double roller final press 64 may include two relatively large rollers moving in opposite directions spaced apart by about the thickness of a work piece in order to fully imbed teeth or engagement members on one face of the plates into the work piece.

Accordingly, embodiments of the present invention may provide a mechanism for cutting, pre-plating, and transporting truss members (e.g., work pieces) to a station at which the members may be assembled automatically and thereafter prepared for shipment to the customer. Thus, a fully implemented system as described above may enable substantially full automation of the truss manufacturing process. Moreover, for each different truss design, automatic setup may be accomplished. In this regard, for example, either from a central location (e.g., the control station 70) or merely by entering data at each individual station, truss design data may be provided to various components at the stations described above to enable automatic setup of the stations or components for the performance of functions according to the truss design data. In an exemplary embodiment, the truss design data could be included in or indicated by indicia that may be provided on each work piece and read therefrom during the assembly process.

Figure 6:
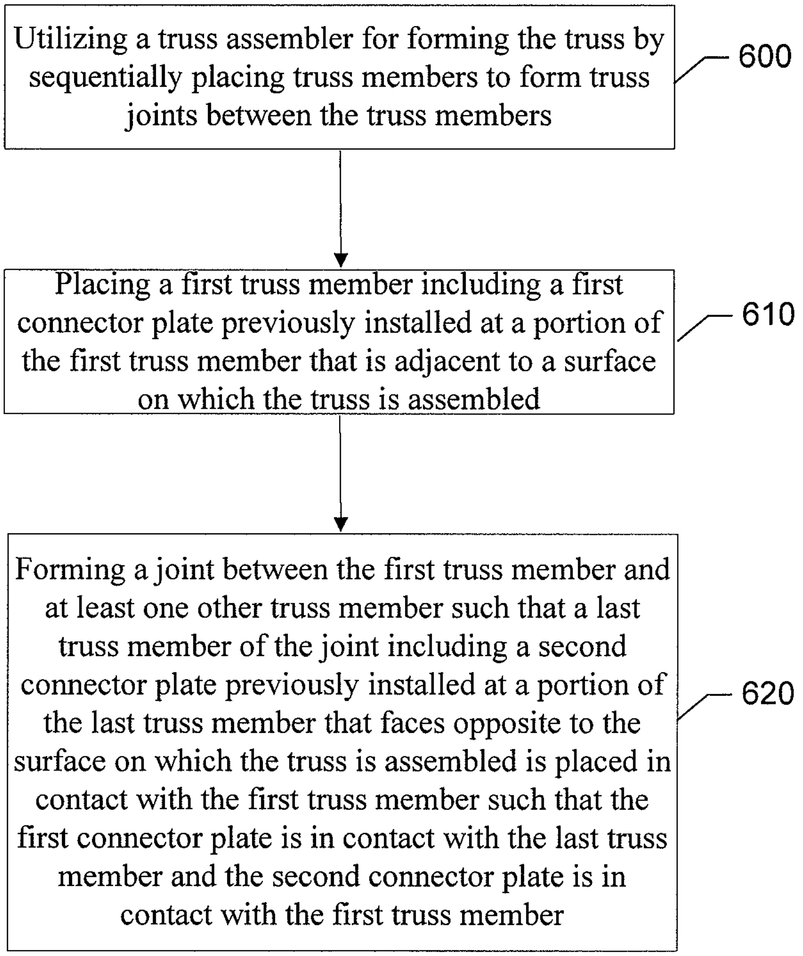
FIG. 6 illustrates a method of truss assembly according to an exemplary embodiment of the present invention.

FIG. 6 is a flowchart of a method and computer program product according to an exemplary embodiment of the invention. As such, each block or step of the flowchart, and combinations of blocks in the flowchart, can be implemented by various means, such as one or more of hardware, firmware, or software including one or more computer program instructions. In some embodiments, one or more of the procedures described above may be embodied by computer program instructions, which may embody the procedures described above and may be stored by a memory device of, for example, the a machine controller (or the control station 70) and executed thereby. Any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block (s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method of pre-plating truss members, as shown in FIG. 6, may include utilizing a truss assembler for forming the truss at operation 600. The truss assembly may be made by sequentially placing truss members to form truss joints between the truss members by placing a first truss member including a first connector plate previously installed at a portion of the first truss member that is adjacent to a surface on which the truss is assembled at operation 610 and forming a joint between the first truss member and at least one other truss member such that a last truss member of the joint including a second connector plate previously installed at a portion of the last truss member that faces opposite to the surface on which the truss is assembled is placed in contact with the first truss member such that the first connector plate is in contact with the last truss member and the second connector plate is in contact with the first truss member at operation 620.

In an exemplary embodiment, operation 620 may include placing the last truss member in contact with first truss member such that the second connector plate substantially mirrors the first connector plate. In some cases, operation 600 may include utilizing the truss assembler for forming the truss by sequentially placing truss members comprises sequentially placing the truss members based on an order of the truss members in a member queue or based on truss design data defining a planned location of pre-plated truss members within an assembled truss.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

That which is claimed:

1. A method of assembling a truss comprising:

utilizing a truss assembler for forming the truss by sequentially placing truss members to form truss joints between the truss members by:

placing a first truss member including a first connector plate previously installed at a portion of the first truss member that is adjacent to a surface on which the truss is assembled; and forming a joint between the first truss member and at least one other truss member such that a last truss member of the joint including a second connector plate previously installed at a portion of the last truss member that faces opposite to the surface on which the truss is assembled is placed in contact with the first truss member such that the first connector plate is in contact with the last truss member and the second connector plate is in contact with the first truss member.

2. The method of claim 1, wherein forming the joint comprises placing the last truss member in contact with first truss member such that the second connector plate is on an opposite side of the joint from the first connector plate.

3. The method of claim 1, wherein utilizing the truss assembler for forming the truss by sequentially placing truss members comprises sequentially placing the truss members based on an order of the truss members in a member queue.

4. The method of claim 1, wherein utilizing the truss assembler for forming the truss by sequentially placing truss members comprises sequentially placing the truss members based on truss design data defining a planned location of pre-plated truss members within an assembled truss.

5. A computer program product for controlling automatic assembly of a truss, the computer program product comprising at least one non-transitory computer-readable storage medium having computer-executable program code portions stored therein, the computer-executable program code portions comprising:

program code instructions for placing a first truss member including a first connector plate previously installed at a portion of the first truss member that is adjacent to a surface on which the truss is assembled; and program code instructions for forming a joint between the first truss member and at least one other truss member such that a last truss member of the joint including a second connector plate previously installed at a portion of the last truss member that faces opposite to the surface on which the truss is assembled is placed in contact with the first truss member such that the first connector plate is in contact with the last truss member and the second connector plate is in contact with the first truss member.

6. The computer program product of claim 5, wherein the program code instructions for forming the joint comprises program code instructions for placing the last truss member in contact with first truss member such that the second connector plate is on an opposite side of the joint from the first connector plate.

7. The computer program product of claim 5, further comprising program code instructions for sequentially placing the truss members based on an order of the truss members in a member queue.

8. The computer program product of claim 5, further comprising program code instructions for sequentially placing the truss members based on truss design data defining a planned location of pre-plated truss members within an assembled truss.

* * * * *